Aug. 3, 1926. 1,594,586
O. A. ANDERSON
TIRE LOCK
Filed April 7, 1922
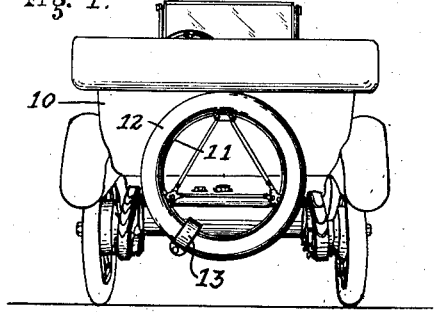
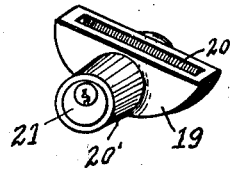
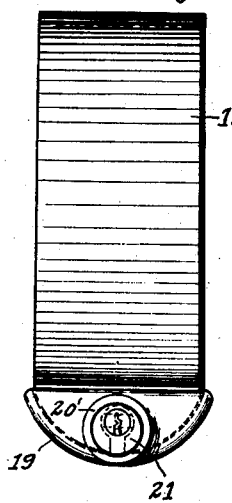
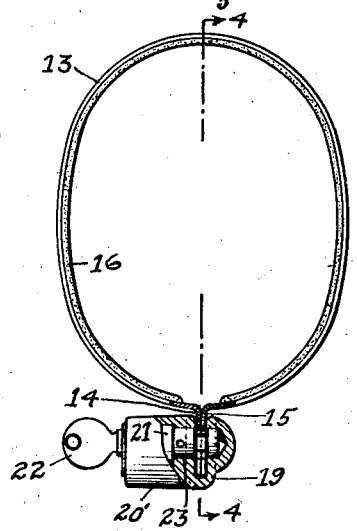
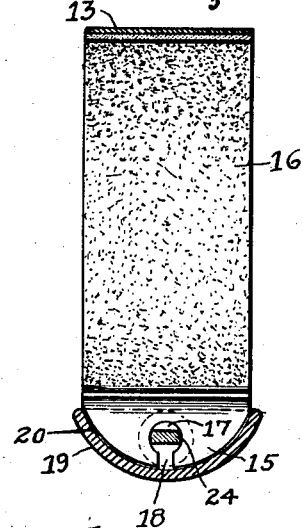
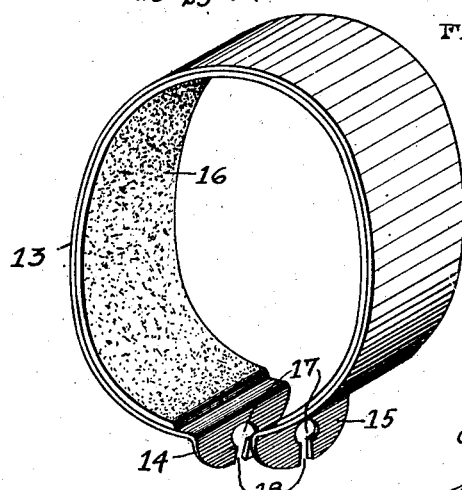
Inventor
O. A. Anderson
by B. M. Kent
Attorney Patented Aug. 3, 1926

1,594,586

UNITED STATES PATENT OFFICE.

OLAF A. ANDERSON, OF HAMILTON, OHIO.

TIRE LOCK.

Application filed April 7, 1922. Serial No. 550,459.

This invention relates to locking devices and more particularly to devices for locking a spare tire to the carrier of an automobile.

One of the objects of the invention is to provide a device that will be comparatively inexpensive to manufacture and yet constitute a secure locking device that will be difficult to open and hence retard a thief to such an extent as to render the device practically thief-proof.

Other objects of the invention and the features of novelty will be apparent from the following description taken in connection with the accompanying drawings of which:

Figure 1 is an elevation of the rear of an automobile showing my invention applied thereto;

Fig. 2 is an enlarged side elevation of the form of the invention illustrated in Fig. 1;

Fig. 3 is an elevation at right angles to Fig. 2 with certain parts broken away;

Fig. 4 is a section on the line 4—4 of Fig. 3;

Fig. 5 is a prospective view of the lock; and

Fig. 6 is a prospective view of the device with the lock removed.

Referring to the drawings, 10 indicates an automobile, and 11 the carrier for the spare tire 12, the carrier as ordinarily constructed, comprising a band or portion of a band for supporting the rim of the tire.

According to my invention I provide a band or cuff 13 which is adapted to surround the tire and the band of the carrier 11, on which it is supported, and thereby secure the spare tire to the carrier. The ends of the band 13 are turned outwardly as indicated at 14 and 15 and adapted to be positioned side by side, as best shown in Fig. 3. In order to prevent rattling and wear, the band 13 is lined with any suitable fabric 16, which may be secured thereto by rivets or in any other preferred manner.

The ends 14 and 15 are provided with aligned openings 17, preferably of circular form, and these openings have relatively restricted extensions 18 to the edges of these ends, as best shown in Fig. 6.

In order to lock the ends 14 and 15 together so as to prevent removal of the band 13, I provide a housing 19 having a slot 20 to receive and substantially enclose the ends 14 and 15, as best shown in Figs. 3 and 4. The housing 19 has a boss 20' on one side thereof in which there is arranged a pin lock 21 adapted to be actuated by a key 22. The lock 21 is of ordinary construction and actuates a rotatable bolt 23, this bolt having a portion 24 which, in one position, will pass thru the opening extensions 18 as the housing is being slipped over the ends 14 and 15. When the housing is in position on the ends 14 and 15, the bolt 23 may be rotated, the portion 24 assuming the position shown in Fig. 4 at right angles to the position in which it passed thru the extensions 18.

From Fig. 4 it will be evident that the bolt 23 serves to retain the housing 19 on the ends 14 and 15 and, therefore, locks the ends together. When it is desired to remove the band, it is only necessary to rotate the bolt 23, by means of the key 22, so as to permit the portion 24 of the bolt to pass thru the opening extensions 18.

The band 13 is preferably made of high grade spring steel properly hardened and spring-tempered so as to have the requisite flexibility to permit separation of the ends 14 and 15 to pass over a tire. The housing 19 with its boss 20 will be preferably made of a tough, hard metal that will resist sawing or fracture by hammering. With the band made of spring steel it will be practically impossible to saw or file it in two, and the whole construction of the device is such that it will retard a thief to such an extent that, under ordinary circumstances, he would be detected in any effort to break thru the locking device for the purpose of stealing the spare tire.

Having thus described my invention, what I claim is:

1. In a device of the class described, the combination with a band adapted to surround a tire and having outwardly turned ends, said ends having aligned openings therein extending to the edges thereof, of a locking device comprising a housing having a slot therein to receive said ends and carrying a key controlled rotatable bolt to slip into said openings as said ends enter said slot and to be turned in said openings to retain said locking device in position.

2. In a device of the class described, the combination of a flexible metallic band having outwardly turned ends arranged side by side and provided with aligned openings having relatively restricted extensions to the edges of said ends, and a locking device comprising a housing having a slot to receive said ends and a rotatable key controlled locking bolt having a part adapted, in one position, to pass through said opening extensions when said ends enter said slot and upon being turned in said opening at right angles to said position, to prevent removal of said housing from said ends.

3. In a device of the class described, the combination with a band adapted to surround a tire and having outwardly turned ends, one of said ends having an opening therein with a narrow extension to the edge thereof, of a locking device comprising a one piece housing having a slot therein to receive said ends and carrying a flat rotatable bolt to slip into said extension as said ends enter said slot and to be turned in said opening to retain said locking device in position.

In testimony whereof I affix my signature.

OLAF A. ANDERSON.